US012276901B2

(12) United States Patent
Lv (10) Patent No.: US 12,276,901 B2
(45) Date of Patent: Apr. 15, 2025

(54) HIGH-STABILITY 360-DEGREE ROTATING PHOTO BOOTH

(71) Applicant: Shenzhen Vanplex Co., Ltd, Shenzhen (CN)

(72) Inventor: Hongwen Lv, Shenzhen (CN)

(73) Assignee: Shenzhen Vanplex Co., Ltd, Shenzhen (CN)

( * ) Notice: Subject to any disclaimer, the term of this patent is extended or adjusted under 35 U.S.C. 154(b) by 0 days.

(21) Appl. No.: 18/911,135

(22) Filed: Oct. 9, 2024

(65) Prior Publication Data

US 2025/0036012 A1    Jan. 30, 2025

(30) Foreign Application Priority Data

Sep. 11, 2024    (CN) .......................... 202422228906.0

(51) Int. Cl.
    *G03B 17/56*    (2021.01)
    *F16M 11/20*    (2006.01)

(52) U.S. Cl.
    CPC ....... *G03B 17/561* (2013.01); *F16M 11/2014* (2013.01); *F16M 2200/08* (2013.01)

(58) Field of Classification Search
    None
    See application file for complete search history.

(56) References Cited

U.S. PATENT DOCUMENTS

| | | | | |
|---|---|---|---|---|
| 4,236,795 A * | 12/1980 | Kephart | ................ | G03B 15/06 396/428 |
| 9,641,730 B2 * | 5/2017 | Rosenberry | ............ | F16M 13/00 |
| 11,719,380 B1 * | 8/2023 | Wang | ..................... | F16M 11/08 108/20 |
| 11,720,000 B1 * | 8/2023 | Huang | ................... | F16M 11/18 362/8 |
| 2015/0042822 A1 | 2/2015 | Le | | |
| 2016/0004140 A1 | 1/2016 | Tada et al. | | |
| 2023/0168566 A1 * | 6/2023 | Zhang | ................... | G03B 15/07 396/2 |
| 2023/0221626 A1 * | 7/2023 | Lei | ........................ | F16M 11/08 396/419 |
| 2023/0269480 A1 * | 8/2023 | Hou | ...................... | F16M 11/18 348/129 |
| 2024/0052974 A1 | 2/2024 | Shi | | |

* cited by examiner

*Primary Examiner* — Rodney E Fuller
(74) *Attorney, Agent, or Firm* — Hemisphere Law, PLLC; Zhigang Ma (57) ABSTRACT

Provided is a high-stability 360-degree rotating photo booth, including a supporting base, a shooting platform, a driving assembly, and a rotating shooting bracket driven by the driving assembly and capable of rotating 360 degrees. The shooting platform includes a platform cover plate, and a platform frame for arranging the platform cover plate, and further includes at least two supporting pillars which are arranged between the platform frame and the supporting base and used for supporting. The driving assembly includes a driving motor. The rotating shooting bracket includes a rotating connecting portion located between the platform frame and the supporting base.

9 Claims, 10 Drawing Sheets

HIGH-STABILITY 360-DEGREE ROTATING PHOTO BOOTH

TECHNICAL FIELD

The present disclosure relates to the technical field of rotating photo booth products applied to the occasions such as outdoor activities, parties, and gatherings, and in particular to a high-stability 360-degree rotating photo booth with a reasonable structural design and higher use experience.

BACKGROUND

As is well known, the 360-degree photo booth, also known as 360 photo booth, is a platform for 360-degree shooting, which, compared with ordinary self-timer products, has a further entertainment experience in terms of application effect. Moreover, through such an apparatus, a photographed subject can stand on the supporting table and is photographed by rotating the rotatable shooting bracket, and the experience and the interest of shooting of the user are greatly enriched in actual use.

The structural construction of the existing photo booth products is mainly formed by connecting the supporting stage and the supporting base with a central shaft in the middle. During the event, 3-6 people or more can stand on the supporting stage. If there are many people, they will stand around the edge of the supporting stage, often leading to the deformation of the supporting stage because the edge of the supporting stage is too far away from the central shaft to support the stage. Secondly, Because the power and gravity generated by the jumping or large-scale action of the user on the supporting stage can only be supported by the central shaft, the concentration of the bearing force on the central shaft often results in loosening or even desoldering or fracture of the central shaft, the supporting stage and the central shaft, which greatly increases the danger in use.

For example, in the invention patent with the patent number of CN202221031966.8 and entitled "360-degree camera device having atmosphere lamp", a 360-degree camera device having atmosphere lamp is provided, including a supporting stage, a supporting spindle, a supporting base and a rotating shooting bracket. The supporting stage includes a first supporting element, tempered glass, a first light source, and a reflecting mirror. The first supporting element is used for supporting the tempered glass. The tempered glass is single-sided perspective glass including a light-transmitting surface and a reflecting surface. An interval area is arranged between the tempered glass and the reflecting mirror. The reflecting mirror and the reflecting surface are oppositely arranged. The first light source is disposed in the interval area. The first light source is in a shape of graphics and/or characters. The first light source includes a plurality of point-shaped light-emitting parts, and the first light source is substantially arranged in an annular shape and arranged along edge contour of the tempered glass or the reflecting mirror. The supporting stage includes a second supporting element, the second supporting element is used for supporting a central position of the tempered glass, and the first supporting element is used for supporting an edge position of the tempered glass.

Figure 1:
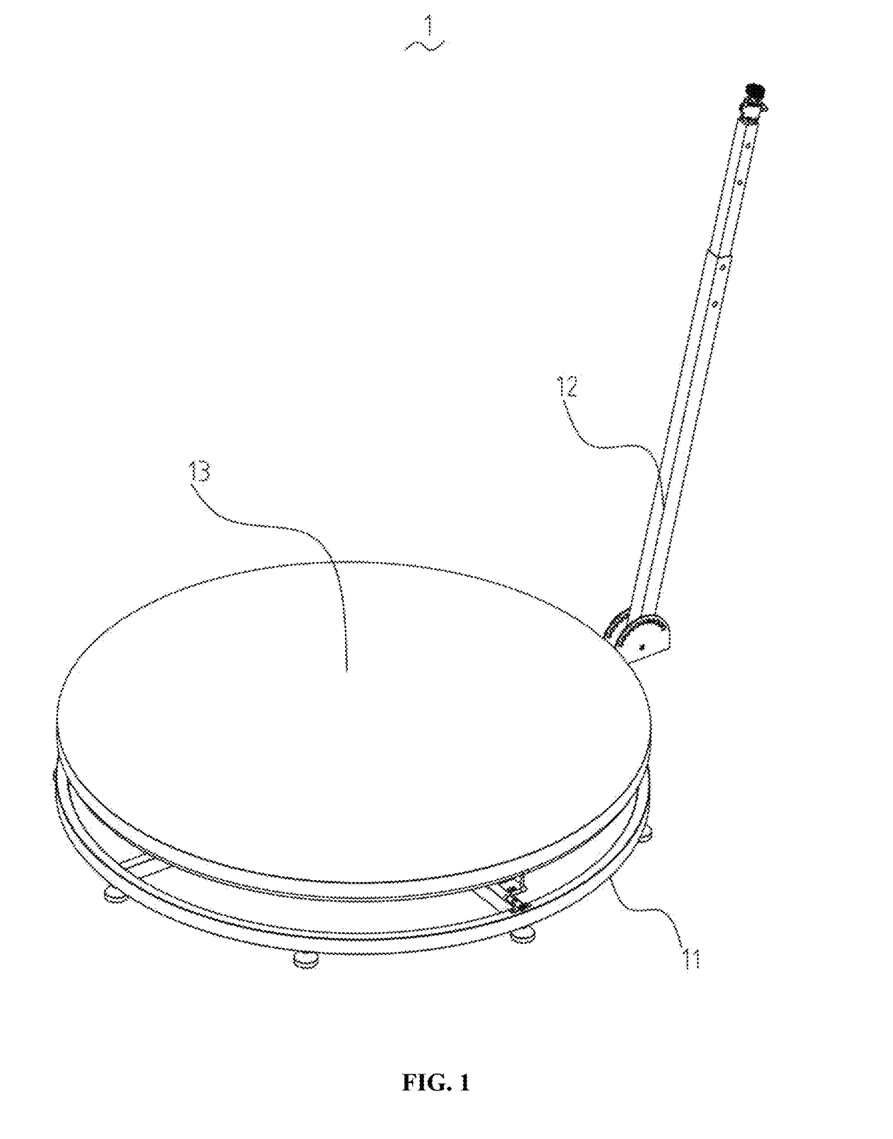
FIG. 1 is a schematic structural diagram of a three-dimensional state of a high-stability 360-degree rotating photo booth according to Embodiment 1 of the present disclosure.

In the above prior art patent document, an independent intermediate rotating shaft structure is adopted (referring to FIG. 1 in this specification), and when the user stands at one side of the stage, it is prone to stage deviation and unstable standing, which affects the actual use.

Therefore, there is an urgent need to improve the structure of the prior art to provide a novel 360-degree photo booth with high stability design, which can effectively enhance the stability of the platform during practical application, and avoid loosening and desoldering of parts.

SUMMARY

The problem in the prior art solved by the present disclosure is as follows:

The structural construction of the existing photo booth products is mainly formed by connecting the supporting stage and the supporting base with a central shaft in the middle. During the event, 3-6 people or more can stand on the supporting stage. However, if there are many people, they will stand around the edge of the supporting stage, often leading to the deformation of the supporting stage because the edge of the supporting stage is too far away from the central shaft to support the stage. Secondly, Because the power and gravity generated by the jumping or large-scale action of the user on the supporting stage can only be supported by the central shaft, the concentration of the bearing force on the central shaft often results in loosening or even desoldering or fracture of the central shaft, the supporting stage and the central shaft, which greatly increases the danger in use.

The solution adopted by the present disclosure for solving the technical problem is as follows:

A high-stability 360-degree rotating photo booth includes a supporting base, a shooting platform, a driving assembly located between the supporting base and the shooting platform, and a rotating shooting bracket driven by the driving assembly and capable of rotating 360 degrees.

The shooting platform includes a platform cover plate, and a platform frame for arranging the platform cover plate, and further includes at least two supporting pillars arranged between the platform frame and the supporting base and used for supporting.

The driving assembly includes a driving motor, the rotating shooting bracket includes a rotating connecting portion located between the platform frame and the supporting base.

An output shaft of the driving motor is connected to the rotating connecting portion by gear drive or a belt, thus driving the rotating connecting portion to rotate.

Preferably, the platform frame includes an outer platform frame, and at least one or at least one circle of first reinforcing rods connected to an inner side of the outer platform frame.

The supporting base includes an outer base frame, and at least one or at least one circle of second reinforcing rods connected to an inner side of the outer base frame.

Both ends of each supporting pillar are in fit connection with the first reinforcing rod and the second reinforcing rod, respectively.

Preferably, the driving assembly further includes a drive bearing fixedly arranged on the platform frame or the supporting base.

The driving assembly further includes a drive ring gear in fit connection with an outer ring or an inner ring of the drive gear; and the rotating connecting portion is in fit connection with the drive ring gear.

An output shaft of the driving motor is in fit connection with the drive ring gear through gear meshing, thus driving the drive ring gear and the rotating connecting portion to make circumferential rotation.

The supporting pillar is located on an inner side of the drive bearing.

Preferably, the driving assembly further includes a drive bearing fixedly arranged on the platform frame or the supporting base.

The rotating connecting portion is in fit connection with the outer ring or inner ring of the drive bearing.

The output shaft of the driving motor is in fit connection with the outer ring or inner ring of the drive bearing through a drive belt, thus driving the drive ring gear to operate, and synchronously driving the rotating connecting portion to make circumferential rotation.

The supporting pillar is located on the inner side of the drive bearing.

Preferably, the number of the first reinforcing rods is two or more. The inner side of the outer platform frame is provided with an oblique reinforcing rib for enhancing the stability of the first reinforcing rod, and both ends of the oblique reinforcing rib are connected to two adjacent first reinforcing rods, respectively.

Preferably, the outer ring or inner ring of the drive bearing is fixedly connected to the platform frame or the supporting base.

The rotating connecting portion is of an arc or annular structure, and fixedly connected to the drive ring gear by a screw or welding.

The drive bearing and the supporting pillar are located at middle parts of the inner sides of the platform frame and the supporting base.

Preferably, the outer ring or inner ring of the drive bearing is fixedly connected to the platform frame or the supporting base.

A belt connecting groove for sleeving the drive belt is circumferentially formed in the outer ring or the inner ring of the drive bearing.

The rotating connecting portion is of an arc or annular structure, and fixedly connected to the outer ring or the inner ring of the drive bearing by a screw or welding.

The drive bearing and the supporting pillar are located at the middle parts of the inner sides of the platform frame and the supporting base.

Preferably, the driving motor is located on an outer side of the drive bearing.

The driving motor is fixedly arranged on the second reinforcing rod, or a motor mounting plate for mounting the driving motor is further connected to an inner side of the outer base frame.

Preferably, the supporting pillars are arranged between the platform frame and the supporting base in a symmetric or matrix manner.

One or both ends of the supporting pillar are movably connected to the platform frame or the supporting base by screws or welding structures.

Preferably, the rotating shooting bracket further includes a rotating connecting rod connected to the rotating connecting portion and extending out of the shooting platform and the outside of the supporting base.

The technical effects produced by solving the technical problem by the present disclosure are as follows:

Compared with the prior art, a high-stability 360-degree rotating photo booth 1 is provided with a supporting base 11, a shooting platform, a driving assembly located between the supporting base 11 and the shooting platform, and a rotating shooting bracket 12 driven by the driving assembly and capable of rotating 360 degrees at the same time. The shooting platform includes a platform cover plate 13, and a platform frame 14 for arranging the platform cover plate 13, and further includes at least two supporting pillars 15 which are arranged between the platform frame 14 and the supporting base 11 and used for supporting. The driving assembly includes a driving motor 16. The rotating shooting bracket 12 includes a rotating connecting portion 122 located between the platform frame 14 and the supporting base 11. An output shaft of the driving motor 16 is connected to the rotating connecting portion 122 through gear drive or a belt, thus driving the rotating connecting portion 122 to rotate. In practical application, the stability of the device in the running process can be effectively improved through the arrangement of multiple supporting pillars 15, and the problem of low stability in the traditional design that a single central supporting shaft is used for overall support can be solved.

DETAILED DESCRIPTION OF THE EMBODIMENTS

In order to make the objectives, technical solutions and advantages of the present disclosure more clearly, the present disclosure is further described in detail below with reference to the accompanying drawings and embodiments.

It should be understood that specific embodiments described here are only used to illustrate rather than limiting the present disclosure.

All other embodiments obtained by those of ordinary skill in the art based on the embodiments of the present disclosure without creative efforts shall fall within the scope of protection of the present disclosure.

It should be noted that when an assembly is said to be "fixed" to another assembly, it can be directly on another assembly or there may be an intervening assembly. When an assembly is said to be "connected" to another assembly, it can be directly connected to another assembly or there may be an intervening assembly.

Unless otherwise defined, all technical and scientific terms used herein have the same meaning as commonly understood by those skilled in the art of the present disclosure.

The terminology used in the description of the present disclosure herein is only for the purpose of describing specific embodiments and is not intended to limit the present disclosure. It may be understood that the term "and/or" used herein refers to and covers any and all possible combinations of one or more of the associated listed items.

Some embodiments of the present disclosure are further described below in detail with reference to the accompanying drawings. It should be noted that the following embodiments and features in the embodiments may be combined with each other without causing conflict.

Please referring to FIG. 1 to FIG. 4, a high-stability 360-degree rotating photo booth 1 includes a supporting base 11, a shooting platform, a driving assembly located between the supporting base 11 and the shooting platform, and a rotating shooting bracket 12 driven by the driving assembly and capable of rotating 360 degrees. During practical application, a user can stand on the shooting platform.

The shooting platform includes a platform cover plate 13, and a platform frame 14 for arranging the platform cover plate 13. During actual manufacturing, the platform cover plate 13 and the platform frame 14 can be locked by screws, welded, or clamped.

The shooting platform further includes at least two supporting pillars 15 arranged between the platform frame 14 and the supporting base 11 and used for supporting. The supporting pillar 15 may be a square rod element, or a cylindrical rod element, and the like.

The driving assembly includes a driving motor 16. The rotating shooting bracket 12 includes a rotating connecting portion 122 located between the platform frame 14 and the supporting base 11.

An output shaft of the driving motor 16 is connected to the rotating connecting portion 122 by gear drive or a belt, thus driving the rotating connecting portion 122 to rotate.

According to the present disclosure, a high-stability 360-degree rotating photo booth 1 is provided with a supporting base 11, a shooting platform, a driving assembly located between the supporting base 11 and the shooting platform, and a rotating shooting bracket 12 driven by the driving assembly and capable of rotating 360 degrees at the same time. The shooting platform includes a platform cover plate 13, and a platform frame 14 for arranging the platform cover plate 13, and further includes at least two supporting pillars 15 which are arranged between the platform frame 14 and the supporting base 11 and used for supporting. The driving assembly includes a driving motor 16. The rotating shooting bracket 12 includes a rotating connecting portion 122 located between the platform frame 14 and the supporting base 11. An output shaft of the driving motor 16 is connected to the rotating connecting portion 122 through gear drive or a belt, thus driving the rotating connecting portion 122 to rotate. In practical application, the stability of the device in the running process can be effectively improved through the arrangement of multiple supporting pillars 15, and the problem of low stability in the traditional design that a single central supporting shaft is used for overall support can be solved.

Figure 2:
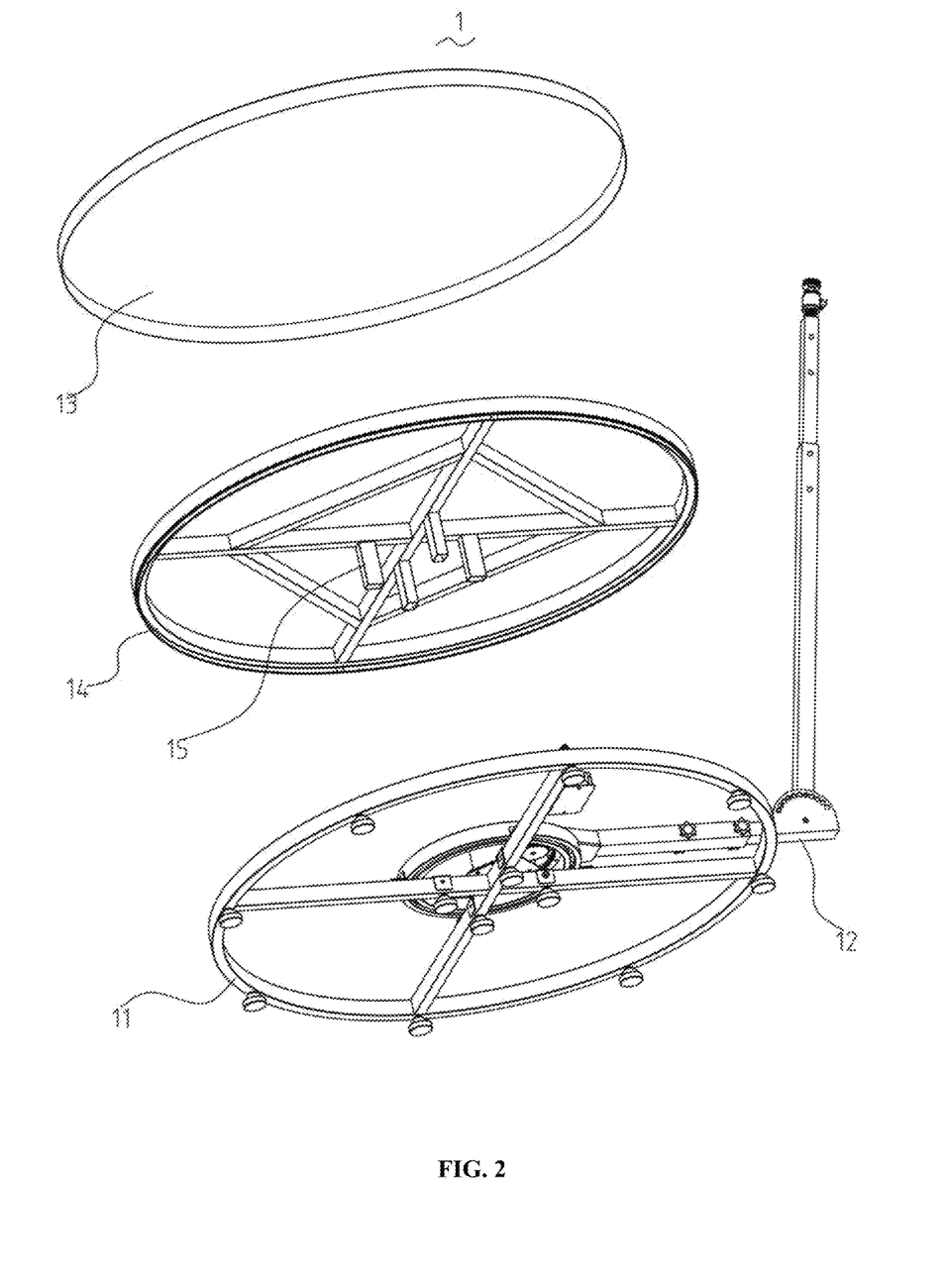
FIG. 2 and FIG. 3 are schematic structural diagrams of an explosive state of a high-stability 360-degree rotating photo booth according to Embodiment 1 of the present disclosure.
Figure 3:
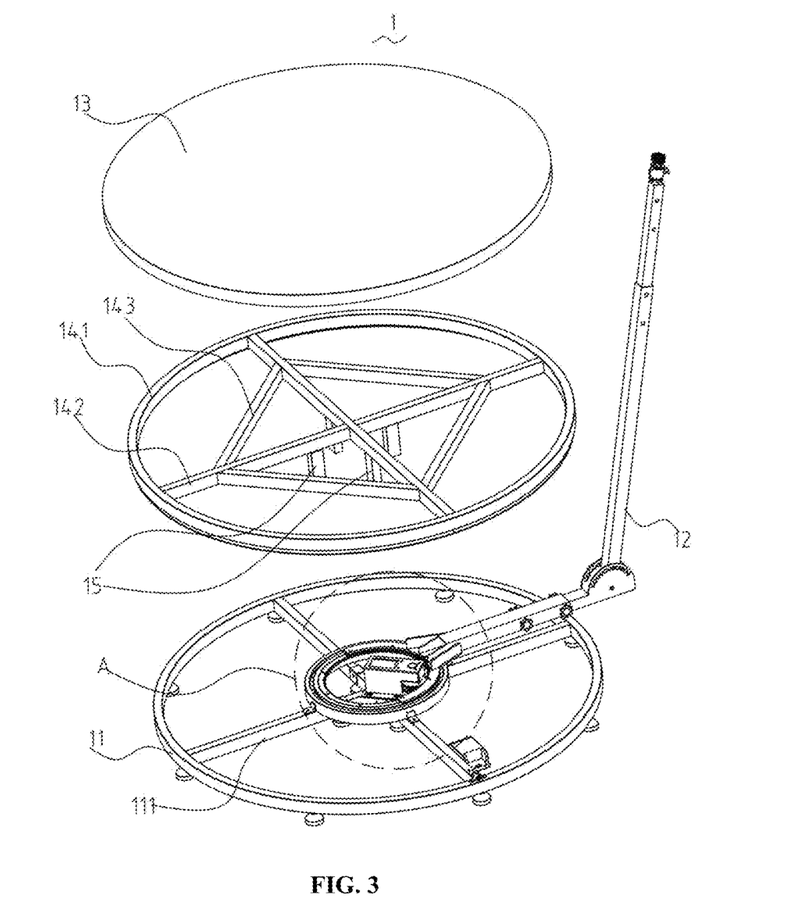
Figure 4:
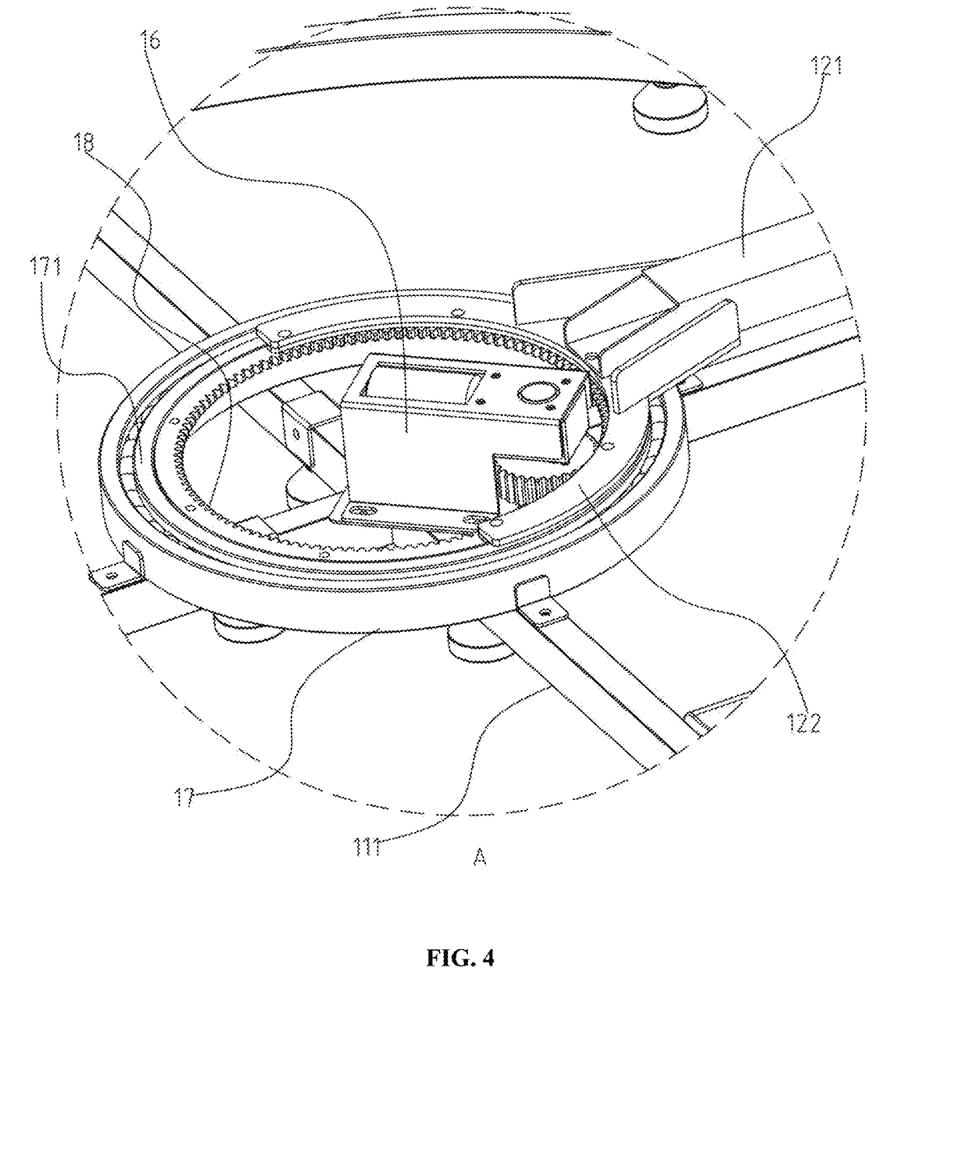
FIG. 4 is an enlarged diagram of part A in FIG. 3.

In some other embodiments, the platform frame 14 includes an outer platform frame, and at least one or at least one circle of first reinforcing rods 142 connected to an inner side of the outer platform frame.

The supporting base 11 includes an outer base frame, and at least one or at least one circle of second reinforcing rods 111 connected to an inner side of the outer base frame.

Both ends of each supporting pillar 15 are in fit connection with the first reinforcing rod 142 and the second reinforcing rod 111, respectively.

The driving assembly further includes a drive bearing fixedly arranged on the platform frame 14 or the supporting base 11, and
further includes a drive ring gear 18 in fit connection with an outer ring 17 or inner ring 171 of the transmission gear. The rotating connecting portion 122 is in fit connection with the drive ring gear 18.

In some other designs, if the rotating connecting portion 122 is designed as a square frame or other shapes. These designs all belong to the equivalent technical solution as long as the rotating connecting portion 122 and the drive ring gear 18 can be fixedly connected to rotate at the same time.

The output shaft of the driving motor 16 is in fit connection with the drive ring gear 18 through gear meshing, thus driving the drive ring gear 18 and the rotating connecting portion 122 to make circumferential rotation.

The supporting pillar 15 is located on an inner side of the drive bearing.

The number of the first reinforcing rods 142 is two or more. The inner side of the outer platform frame is provided with an oblique reinforcing rib 143 for enhancing the stability of the first reinforcing rod 142, and both ends of the oblique reinforcing rib 143 are connected to two adjacent first reinforcing rods 142, respectively.

The outer ring 17 or inner ring 171 of the drive bearing is fixedly connected to the platform frame 14 or the supporting base 11.

The rotating connecting portion 122 is of an arc or annular structure, and fixedly connected to the drive ring gear 18 by a screw or welding.

The drive bearing and the supporting pillar 15 are located at middle parts of the inner sides of the platform frame 14 and the supporting base 11.

The supporting pillars 15 are arranged between the platform frame 14 and the supporting base 11 in a symmetric or matrix manner.

One or both ends of the supporting pillar 15 are movably connected to the platform frame 14 or the supporting base 11 by screws, or welding structures.

The rotating shooting bracket further includes a rotating connecting rod connected to the rotating connecting portion 122 and extending out of the shooting platform and the outside of the supporting base.

The rotating connecting rod and the rotating connecting portion 122 may be in a telescopic connection structure relationship.

Figure 5:
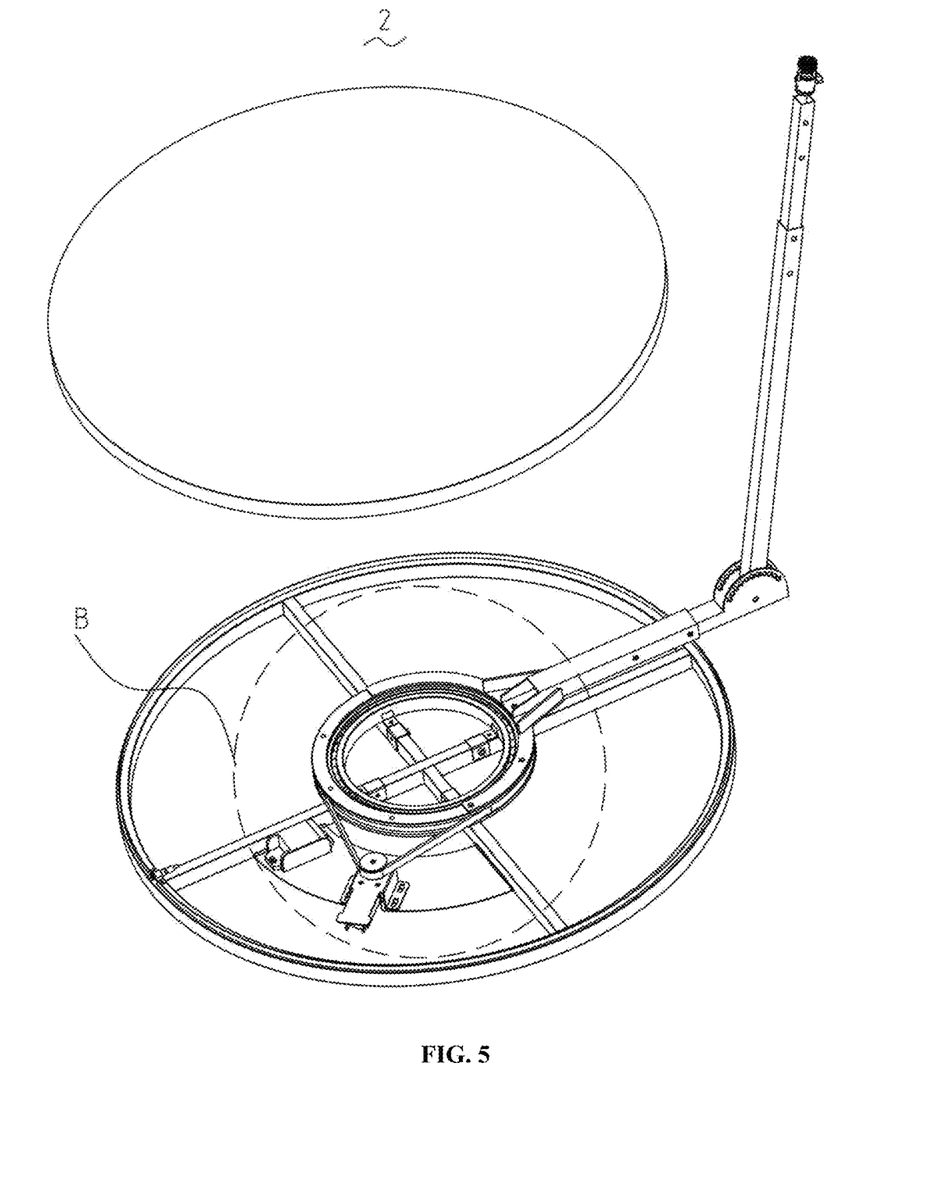
FIG. 5 is a schematic structural diagram of an explosive state of a high-stability 360-degree rotating photo booth according to Embodiment 2 of the present disclosure.
Figure 6:
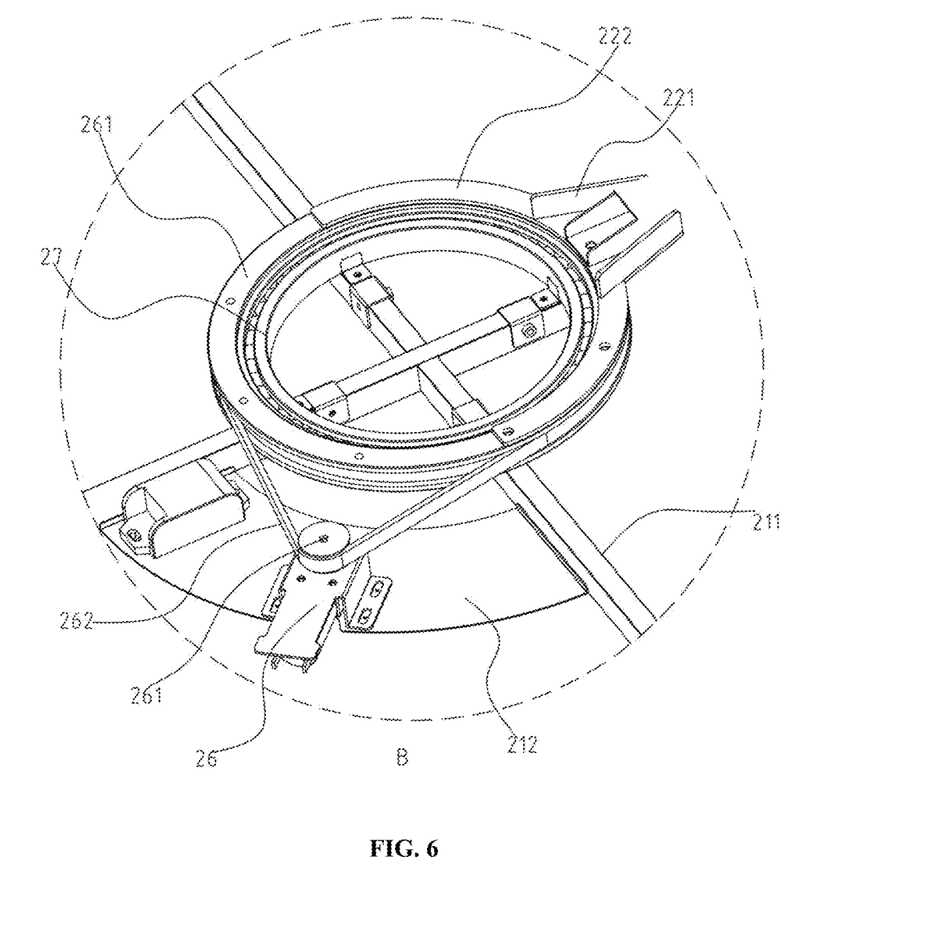
FIG. 6 is an enlarged diagram of part B in FIG. 5.

Referring to FIG. 5 and FIG. 6, the difference between a high-stability 360-degree rotating photo booth 2 in Embodiment 2 of the present disclosure is different from that in Embodiment 1 mainly in the driving structure, which is as follows:

The driving assembly further includes a drive bearing fixedly arranged on the platform frame or the supporting base (e.g., second reinforcing rod 211).

The rotating connecting portion 222 is in fit connection with an outer ring 261 or inner ring 27 of the drive bearing.

An output shaft 261 of the driving motor 26 is in fit connection with the outer ring 261 or inner ring 27 of the drive bearing through a drive belt 262, thus driving the drive ring gear to operate and synchronously driving the rotating connecting portion 222 to make circumferential rotation.

The supporting pillar is located on an inner side of the drive bearing.

The outer ring 261 or inner ring 17 of the drive bearing is fixedly connected to the platform frame or the supporting base.

A belt connecting groove for sleeving the drive belt 262 is circumferentially formed in the outer ring 261 or inner ring 27 of the drive bearing.

The rotating connecting portion 222 is of an arc or annular structure and is fixedly connected to the outer ring 261 or inner ring 27 of the drive bearing by a screw.

The drive bearing and the supporting pillar are located at middle parts of the inner sides of the platform frame and the supporting base.

The driving motor 26 is located on the outer side of the drive bearing.

The driving motor 26 is fixedly arranged on the second reinforcing rod 211, or a motor mounting plate 212 for mounting the driving motor 26 is further connected to an inner side of the outer base frame.

Figure 7:
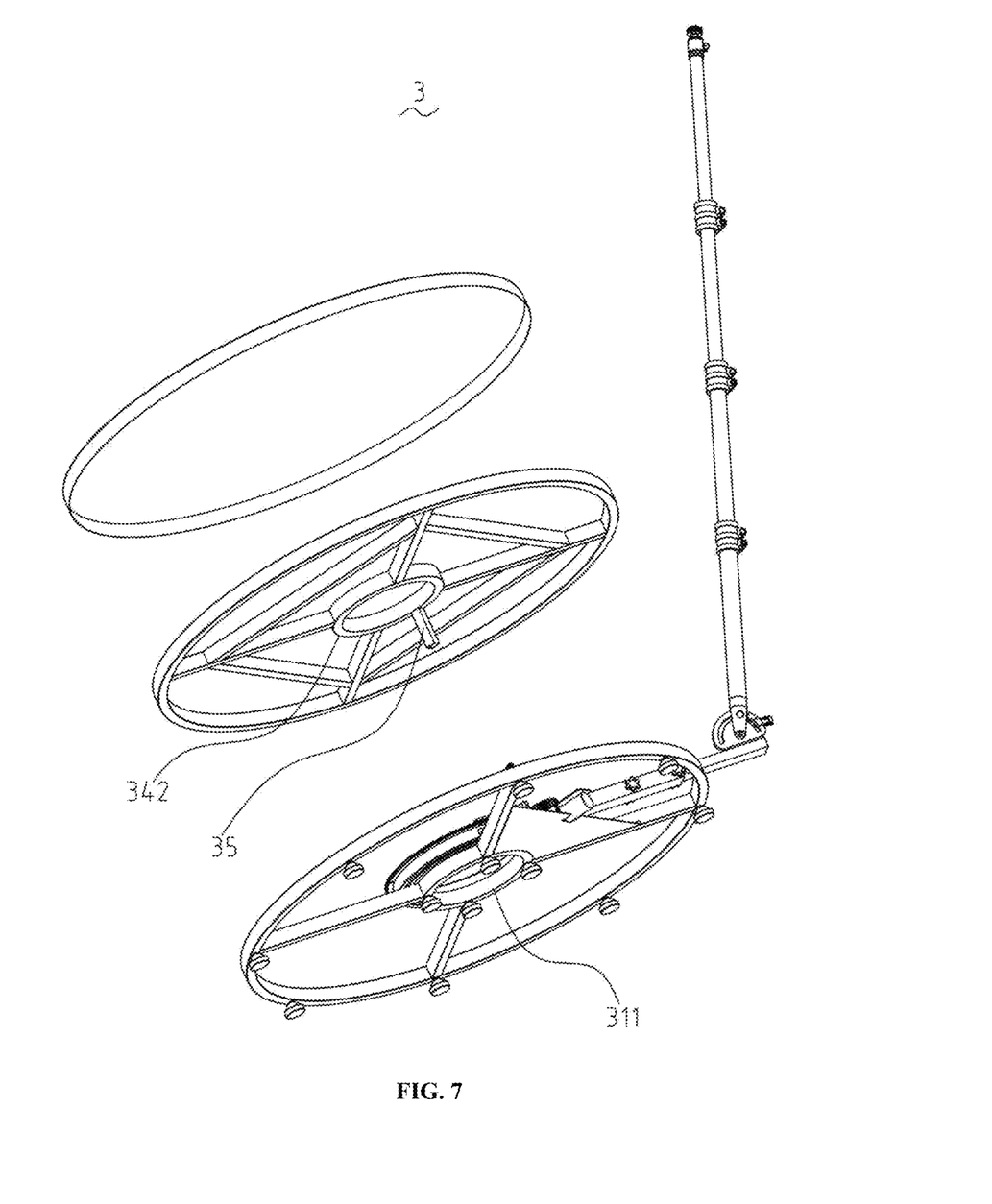
FIG. 7 is a schematic structural diagram of an explosive state of a high-stability 360-degree rotating photo booth according to Embodiment 3 of the present disclosure.

Please referring to FIG. 7, a main difference between a high-stability 360-degree rotating photo booth 3 in Embodiment 3 of the present disclosure and that in Embodiment 1 and Embodiment 2 is that the first reinforcing rod 342 and the second reinforcing rod 311 are of a ring-shaped structure, and the supporting pillar 35 is mounted between the first reinforcing rod 342 and the second reinforcing rod 311. Specifically, the supporting pillar 35, the first reinforcing rod 342 and the second reinforcing rod 311 are connected by screws or in a welding manner, which is not specifically limited in the present disclosure.

Figure 8:
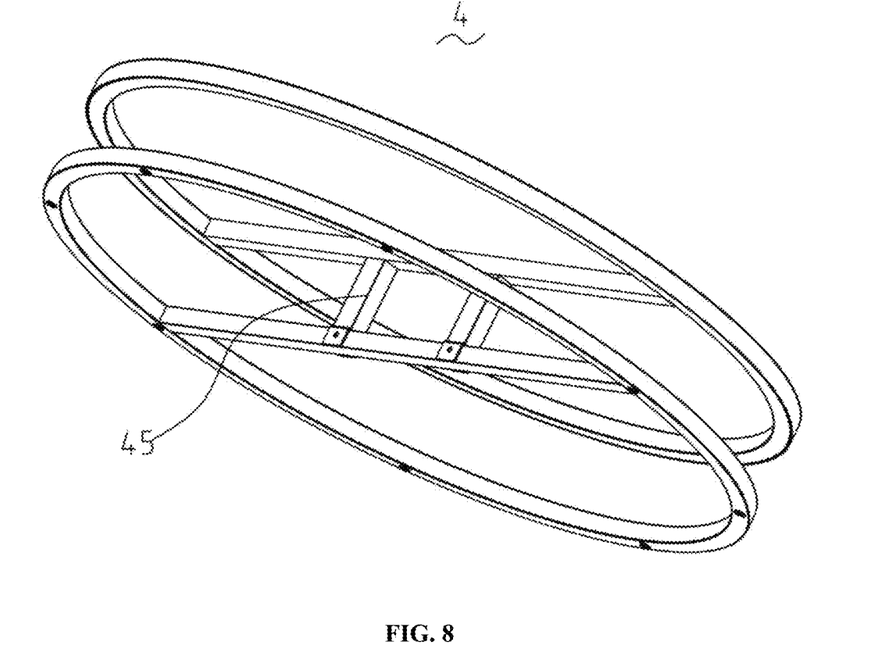
FIG. 8 to FIG. 10 are schematic structural diagrams of three different numbers of supporting pillars.
Figure 9:
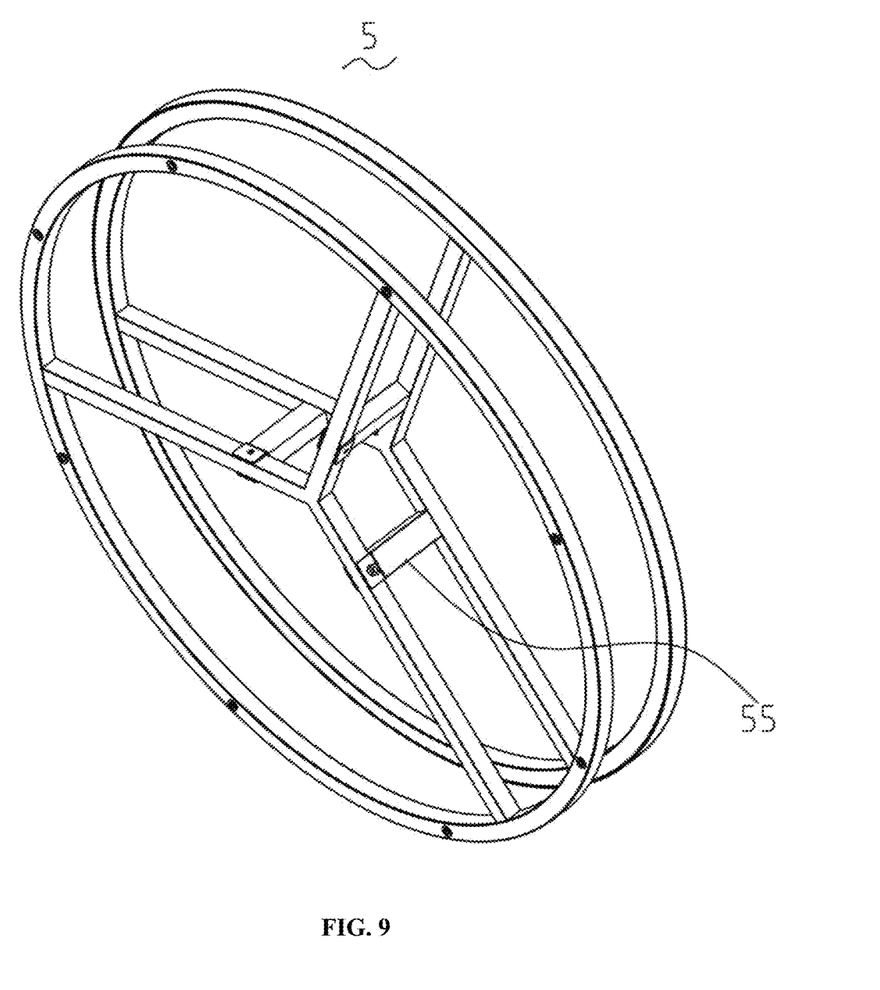
Figure 10:
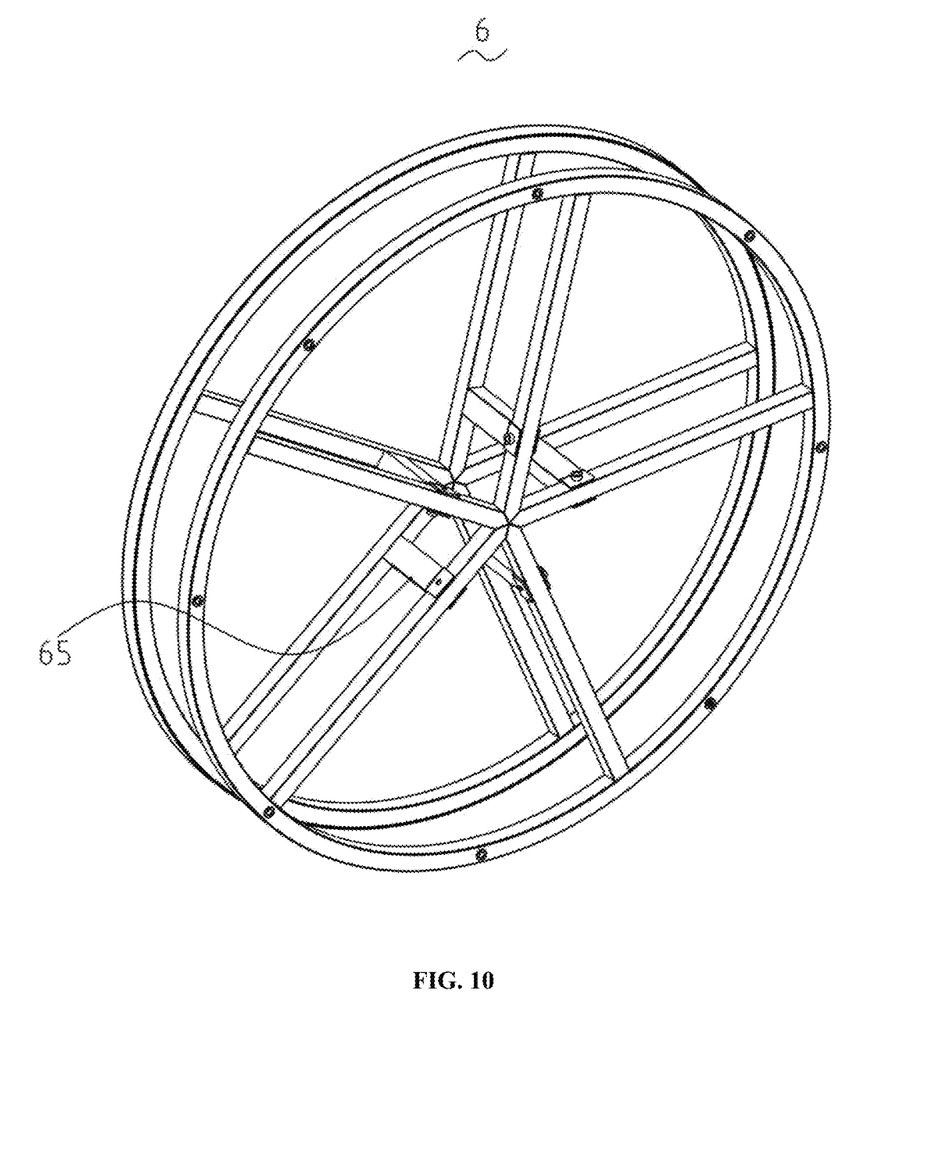

Please referring to FIG. 8 to FIG. 10, schematic diagrams of application states of different numbers of supporting pillars (45/55/65) are mainly displayed. With different numbers of the supporting pillars (45/55/65), the use requirements in different scenarios can be satisfied.

The technical effects produced by solving the technical problem by the present disclosure are as follows:

Compared with the prior art, a high-stability 360-degree rotating photo booth 1 is provided with a supporting base 11, a shooting platform, a driving assembly located between the supporting base 11 and the shooting platform, and a rotating shooting bracket 12 driven by the driving assembly and capable of rotating 360 degrees at the same time. The shooting platform includes a platform cover plate 13, and a platform frame 14 for arranging the platform cover plate 13, and further includes at least two supporting pillars 15 which are arranged between the platform frame 14 and the supporting base 11 and used for supporting. The driving assembly includes a driving motor 16. The rotating shooting bracket 12 includes a rotating connecting portion 122 located between the platform frame 14 and the supporting base 11. An output shaft of the driving motor 16 is connected to the rotating connecting portion 122 through gear drive or a belt, thus driving the rotating connecting portion 122 to rotate. In practical application, the stability of the device in the running process can be effectively improved through the arrangement of multiple supporting pillars 15, and the problem of low stability in the traditional design that a single central supporting shaft is used for overall support can be solved.

The above is only the embodiments of the present disclosure, and the scope of protection of the present disclosure is not limited to the above embodiments. Any modification, equivalent replacement, improvement, etc. made within the spirit and principle of the present disclosure should be included in the scope of protection of the present disclosure.

What is claimed is:

1. A high-stability 360-degree rotating photo booth, comprising a supporting base, a shooting platform, a driving assembly located between the supporting base and the shooting platform, and a rotating shooting bracket driven by the driving assembly and capable of rotating 360 degrees, wherein the shooting platform comprises a platform cover plate, and a platform frame for arranging the platform cover plate, and further comprises at least two supporting pillars arranged between the platform frame and the supporting base and used for supporting;

the driving assembly comprises a driving motor, the rotating shooting bracket comprises a rotating connecting portion located between the platform frame and the supporting base; and an output shaft of the driving motor is connected to the rotating connecting portion by gear drive or a belt, thus driving the rotating connecting portion to rotate;

wherein the platform frame comprises an outer platform frame, and at least one first reinforcing rods or at least one loop of first reinforcing rods connected to an inner side of the outer platform frame;

the supporting base comprises an outer base frame, and at least one or at least one circle of second reinforcing rods connected to an inner side of the outer base frame; and both ends of each supporting pillar are in fit connection with the first reinforcing rod and the second reinforcing rod, respectively.

2. The high-stability 360-degree rotating photo booth according to claim 1, wherein the driving assembly further comprises a drive bearing fixedly arranged on the platform frame or the supporting base;

the driving assembly further comprises a drive ring gear in fit connection with an outer ring or an inner ring of the drive gear; and the rotating connecting portion is in fit connection with the drive ring gear;

an output shaft of the driving motor is in fit connection with the drive ring gear through gear meshing, thus driving the drive ring gear and the rotating connecting portion to make circumferential rotation; and the supporting pillar is located on an inner side of the drive bearing.

3. The high-stability 360-degree rotating photo booth according to claim 2, wherein the outer ring or inner ring of the drive bearing is fixedly connected to the platform frame or the supporting base;

the rotating connecting portion is of an arc or annular structure, and fixedly connected to the drive ring gear by a screw or welding; and the drive bearing and the supporting pillar are located at middle parts of the inner sides of the platform frame and the supporting base.

4. The high-stability 360-degree rotary photographing table according to claim 1, wherein the driving assembly further comprises a drive bearing fixedly arranged on the platform frame or the supporting base;

the rotating connecting portion is in fit connection with the outer ring or inner ring of the drive bearing;

the output shaft of the driving motor is in fit connection with the outer ring or inner ring of the drive bearing through a drive belt, thus driving the drive ring gear to operate, and synchronously driving the rotating connecting portion to make circumferential rotation; and the supporting pillar is located on the inner side of the drive bearing.

5. The high-stability 360-degree rotary photographing table according to claim 4, wherein the outer ring or inner ring of the drive bearing is fixedly connected to the platform frame or the supporting base;

a belt connecting groove for sleeving the drive belt is circumferentially formed in the outer ring or the inner ring of the drive bearing;

the rotating connecting portion is of an arc or annular structure, and fixedly connected to the outer ring or the inner ring of the drive bearing by a screw or welding;

the drive bearing and the supporting pillar are located at the middle parts of the inner sides of the platform frame and the supporting base.

6. The high-stability 360-degree rotating photo booth according to claim 5, wherein the driving motor is located on an outer side of the drive bearing;

the driving motor is fixedly arranged on the second reinforcing rod, or a motor mounting plate for mounting the driving motor is further connected to an inner side of the outer base frame.

7. The high-stability 360-degree rotating photo booth according to claim 1, wherein the number of the first reinforcing rods is two or more; and the inner side of the outer platform frame is provided with an oblique reinforcing rib for enhancing the stability of the first reinforcing rod, and both ends of the oblique reinforcing rib are connected to two adjacent first reinforcing rods, respectively.

8. The high-stability 360-degree rotating photo booth according to claim 1, wherein the supporting pillars are arranged between the platform frame and the supporting base in a symmetric or matrix manner;

one or both ends of the supporting pillar are movably connected to the platform frame or the supporting base by screws or welding structures.

9. The high-stability 360-degree rotating photo booth according to claim 1, wherein the rotating shooting bracket further comprises a rotating connecting rod connected to the rotating connecting portion and extending out of the shooting platform and the outside of the supporting base.

* * * * *